United States Patent [19]
Ogawa

[11] Patent Number: 5,312,714
[45] Date of Patent: May 17, 1994

[54] OPTICAL RECORDING MEDIUM, PROCESS FOR PRODUCING RECORDING MEDIUM, AND INFORMATION RECORDING METHOD

[75] Inventor: Yoshihiro Ogawa, Hachioji, Japan

[73] Assignee: Canon Kabushiki Kaisha, Tokyo, Japan

[21] Appl. No.: 921,585

[22] Filed: Jul. 30, 1992

[30] Foreign Application Priority Data

Aug. 2, 1991 [JP] Japan .................. 3-216580

[51] Int. Cl.$^5$ .................. G11B 7/00; G11B 7/24; G11B 7/26
[52] U.S. Cl. .................. 430/273; 430/269; 430/495; 430/945; 430/321; 369/286; 346/135.1; 428/64
[58] Field of Search .............. 430/273, 945, 269, 495, 430/321; 369/286, 281; 346/135.1; 428/64

[56] References Cited

U.S. PATENT DOCUMENTS

| | | | |
|---|---|---|---|
| 4,503,531 | 3/1985 | Kato | 369/275 |
| 4,871,601 | 10/1989 | Miura et al. | 428/64 |
| 4,965,153 | 10/1990 | Imataki et al. | 430/11 |
| 4,972,402 | 11/1990 | Miura et al. | 369/275.1 |
| 5,026,623 | 6/1991 | Imataki et al. | 430/270 |
| 5,053,288 | 10/1991 | Hashimoto et al. | 428/694 |
| 5,085,925 | 2/1992 | Hiraoka et al. | 428/215 |
| 5,158,859 | 10/1992 | Imatake et al. | 430/271 |
| 5,188,875 | 2/1993 | Yamaoka et al. | 428/64 |

FOREIGN PATENT DOCUMENTS

| | | |
|---|---|---|
| 370622 | 5/1990 | European Pat. Off. |
| 57-167149 | 10/1982 | Japan |
| 60-163245 | 8/1985 | Japan |
| 60-236131 | 11/1985 | Japan |
| 61-73251 | 4/1986 | Japan |
| 63-69045 | 3/1988 | Japan |
| 6417235 | 1/1989 | Japan |
| 1146144 | 6/1989 | Japan |
| 23116 | 1/1990 | Japan |
| 2116036 | 4/1990 | Japan |
| 2273339 | 11/1990 | Japan |
| 3119532 | 5/1991 | Japan |
| 3156742 | 7/1991 | Japan |

OTHER PUBLICATIONS

Bartolini, R. A., et al., "Review and Analysis of Optical Recording Media", *Optical Engineering*, vol. 15, No. 2, Mar.–Apr. 1976, p. 99.

Primary Examiner—Charles L. Bowers, Jr.
Assistant Examiner—John A. McPherson

[57] ABSTRACT

The optical recording medium of the present invention comprises a substrate, a recording layer, and a protective substrate laminated to said recording layer interposing an adhesive layer, wherein said adhesive layer contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

The process for producing it is also provided.

50 Claims, 3 Drawing Sheets

OPTICAL RECORDING MEDIUM, PROCESS FOR PRODUCING RECORDING MEDIUM, AND INFORMATION RECORDING METHOD

BACKGROUND OF THE INVENTION

1. Field of the Invention

The present invention relates to an optical recording medium having a superior durability, in particular, high-temperature durability, and a process for producing the optical recording medium. The present invention also relates to an information recording method.

2. Related Background Art

In recent years, optical recording mediums, recording and reproducing information using light, are proposed as a means for storing a vast amount of information. Conventionally known optical recording methods include, as disclosed in "Review and Analysis of Optical Recording Media" in Optical Engineering, Vol.15, No.2, March–April 1976, pp.99ff., those types in which a recording layer is irradiated with a light beam, e.g., laser light, to cause deformation, hole or bubble production or changes in optical properties in the recording layer.

Materials used for the recording layer are known to include, for example, low-melting metals such as Te, Bi, Sn, Sb and In, dye and pigments (organic coloring matters) such as cyanines, squariums, phthalocyanines, tetradehydrocholines, polymethines, naphthoquinones and benzenedithiol nickel complexes, and composite materials comprised of any of these organic coloring matters and metals.

Of the above recording layer materials, organic coloring matters have been attracting notice in recent years as inexpensive optical recording mediums. More specifically, in organic coloring matter optical recording mediums, the recording layer can be formed on a substrate by solvent coating, and hence such optical recording mediums can promise a better mass-productivity than low-melting metal compound optical recording mediums whose recording layers are formed by vacuum deposition.

In the optical recording medium utilizing the organic coloring matter in the recording layer, the recorded information can be detected because the reflectance at the recording pits decreases as a result of decoloring caused by, for example, thermal decomposition of the organic coloring matter as well as the change of the reflected light from the information reproducing laser light at the recording pits caused by the effect of optical scattering due to the deformation of the recording pits.

In recent years, thinnes has been required for optical recording mediums as the recording-reproducing apparatus becomes small-sized. Optical cards, having the shape of cards, are required to have a thickness of from 0.68 to 0.84 mm according to the ISO standard.

On the other hand, not to be effected by dust or scratches on the substrate surface of the optical recording medium, it is more advantageous for the substrate to be as thick as possible. Usually thickness of about 0.4 to 0.6 mm is suitable. Protective substrates are required to have a thickness of about 0.15 to 0.4 mm. Hence, it is difficult to provide in the optical card having the above thickness what is called the air-gap structure, a structure in which a void space with a gap of about 0.5 to 1 mm is provided between a recording layer formed on a substrate and a protective substrate.

Under these circumstances, thin-type optical recording mediums such as optical cards have an adhered structure in which a protective substrate is laminated to a recording layer interposing an adhesive layer between them.

However, when an adhesive layer is formed directly on a recording layer containing an organic coloring matter (hereinafter "organic coloring matter recording layer"), sometimes the organic coloring matter reacts with an adhesive to cause deterioration of the recording layer, resulting in a decrease in the C/N of the information recorded in the recording layer.

To solve these problems, a laminate optical card is proposed in Japanese Laid-Open Patent Application No. 2-3116 which comprises a recording layer on which an optical information pattern is recorded, an adhesive layer and a spacer layer provided between the recording layer and the adhesive layer. In Japanese Laid-Open Patent Application No. 1-146144(U.S. Ser. No. 598,748, now U.S. Pat. No. 5,085,925), the present applicants have disclosed an optical recording medium making use of an adhesive mainly composed of an ethylene-acrylic acid copolymer, an ethylene-acrylate copolymer or an ethylene-maleic anhydride-acrylic acid terpolymer as an adhesive that does not damage the recording layer.

In the above techniques, however, the method providing the spacer layer has the disadvantage that it requires a complicated manufacturing process which brings about a high cost.

While the adhesive mainly composed of an ethylene-acrylic acid copolymer, an ethylene-acrylate copolymer or an ethylene-maleic anhydride-acrylic acid terpolymer has less interaction with the organic coloring matter in the recording layer, and is an excellent laminating adhesive for optical recording mediums. For the optical recording medium making use of this adhesive, there are still many requirements, for example, the reduction of reflectance of the organic coloring matter recording layer should be minimized to the greatest extent when the optical recording medium is stored in an environment of high temperature and high humidity, e.g., in an environment of 70° C. and 90% RH for 100 hours, or when a high power beam is used as the reproducing light beam. Stated specifically, change rate of reflectance in an environment of 70° C. and 90% RH should be controlled to be 10% or less, particularly 6% or less, and more particularly 4% or less. Also, when continuously irradiated with the high power reproducing light beam, it is desirable that 10% reduction of the reflectance of a recording layer does not occur by 200 seconds or more, particularly 250 seconds or more, and more particularly 280 seconds or more.

SUMMARY OF THE INVENTION

The present invention was made taking account of the prior art discussed above. An object of the present invention is to provide an optical recording medium having a much better durability (or running performance), that does not cause reflectance change even in an environment of high temperature.

Another object of the present invention is to provide a process for producing an optical recording medium having superior durability, that does not cause reflectance change even in an environment of high temperature or in continuous irradiation with a high power reproducing light beam, as well as having superior adhesion.

The optical recording medium of the present invention comprises a substrate, a recording layer and a protective substrate laminated to said recording layer interposing an adhesive layer, wherein said adhesive layer contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

The process for producing an optical recording medium of the present invention comprises the steps of;
laminating a protective substrate to a recording layer formed on a substrate, with an adhesive sheet placed between them; and
subjecting said laminate to thermal press bonding to integrate said substrate and said protective substrate;
wherein said adhesive sheet contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

According to another embodiment, the process for producing an optical recording medium of the present invention comprises the steps of;
laminating a protective substrate provided with an adhesive layer to a substrate provide with a recording layer thereon, in such a way that said recording layer comes into contact with said adhesive layer, and;
subjecting said laminate to thermal press bonding to integrate said substrate and said protective substrate;
wherein said adhesive layer contains a copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

Another embodiment of the optical recording medium of the present invention is an optical recording medium comprising two substrates each provided with a recording layer formed thereon, said substrates being bonded in such a way that said recording layers face each other with an interposed adhesive layer, wherein said adhesive layer contains copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

The information recording method of the present invention comprises;
irradiating an optical recording medium comprising a substrate, a recording layer and a protective substrate laminated to said recording layer interposing an adhesive layer, with a recording light beam to form pits in said recording layer to record information therein; said adhesive layer containing a copolymer selected from the group consisting of an ethylene-acrylic acid copolymer, an ethylene-acrylate copolymer, an ethylene-methacrylic acid copolymer and an ethylene-methacrylate copolymer, and having a Vicat softening point of from 65° C. to 95° C.

According to the present invention, the adhesive layer having a Vicat softening point of 65° C. or above may prevent interaction with the recording layer in an environment of high temperature and high humidity or under irradiation with an intense reproducing light beam, so that an optical recording medium having excellent durability can be obtained.

BRIEF DESCRIPTION OF THE DRAWINGS

FIG. I is a schematic cross section of an embodiment of the optical recording medium according to the present invention.

DESCRIPTION OF THE PREFERRED EMBODIMENTS

The present invention will be described below in detail with reference to the accompanying drawings.

Figure 1:
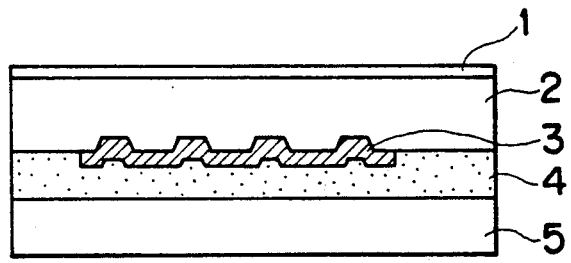

FIG. 1 is a schematic cross section of an optical recording medium according to the present invention, along the direction falling at right angles with its tracking grooves.

In FIG. 1, reference numeral 1 denotes a hard coating layer formed on one side of a transparent substrate 2. Reference numeral 3 denotes an optical recording layer provided on another side, on which a preformat has been formed, of the transparent substrate. Reference numeral 5 denotes a protective substrate bonded to the recording layer 3 interposing an adhesive layer 4.

In the present invention, the adhesive layer 4 contains at least one copolymer selected from an ethylene-acrylic acid copolymer, an ethylene-acrylate copolymer, an ethylene-methacrylic acid copolymer and an ethylene-methacrylate copolymer, and has a Vicat softening point according to ASTM D1525, of from 65° C. to 95° C., and, in particular, preferably from 70° C. to 90° C. Namely, the adhesive layer 4 controlled to have the above composition and physical properties can prevent the interaction between the adhesive and an organic coloring matter in the recording layer, which arises in an environment of high temperature and high humidity or due to the heat generated on the information reproduction using a high power laser light, and also it can prohibit the reduction of recording sensitivity and of adhesion during the information recording with laser light, so that an optical recording medium with a better durability can be obtained.

In the present invention, the copolymer contained in the adhesive layer may have a weight average molecular weight of from about 10,000 to about 1,000,000; for example, an ethylene-acrylic acid copolymer having a structure wherein carboxyl groups are randomly located in a polyethylene structure, as represented, by the structural formula (I):

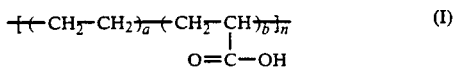
(I)

wherein a, b and n are each a positive integer; an ethylene-acrylate copolymer, which is a copolymer of ethylene with an acrylate, as represented, for example, by the structural formula (II):

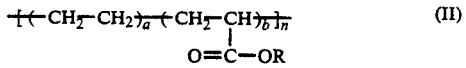

(II)

wherein a, b and n are each a positive integer, and R is $CH_3$, $C_2H_5$ or $C_3H_7$; an ethylene-methacrylic acid copolymer having a structure wherein carboxyl groups are contained at random in a polyethylene molecular structure, as represented, for example, by the structural formula (III):

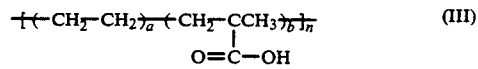

(III)

wherein a, b and n are each a positive integer; and an ethylene-methacrylate copolymer as represented, for example, by the structural formula (IV):

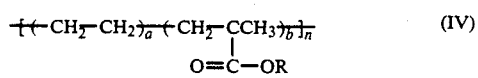

(IV)

wherein a, b and n are each a positive integer, and R is $CH_3$, $C_2H_5$ or $C_3H_7$.

The adhesive layer 4 of the present invention contains at least one of the above four kinds of copolymers, and may contain a mixture of two or more kinds.

In the present invention, the recording layer may contain a mixture of at least two different copolymers of the same kind of copolymers, for example, a mixture of an ethylene-methyl methacrylate copolymer and an ethylene-ethyl methacrylate copolymer.

In the present invention, the Vicat softening temperature of the adhesive layer 4 can be controlled by appropriately changing any of the following three main factors alone or in combination of two or more.

(1) Amount of the acrylic acid, acrylate, methacrylic acid or methacrylate in each copolymer described above, contained in the adhesive layer 4.

(2) Amount(s) of the copolymer(s) contained in the adhesive layer.

(3) Additives in the adhesive layer.

In the present invention, in order to prevent the interaction between the recording layer and adhesive layer, it is particularly preferable to adjust the softening temperature by controlling the factor (1) and use no additive or use additives in amounts as small as possible. In the present invention, the adhesive layer may preferably contain the copolymer(s) in an amount ranging from 80% to 100% by weight, particularly from 90% to 100% by weight, and more particularly from 95% to 100% by weight, in total on the basis of the adhesive layer, and the acrylic acid, acrylate, methacrylic acid or methacrylate in the copolymer contained in the adhesive layer of the present invention may preferably be contained in an amount of not more than 20% by weight, particularly in the range of from 8% to 15% by weight, and more particularly from 9% to 12% by weight, calculated as monomers.

Within the above compositional range, the Vicat softening temperature of the adhesive layer is adjusted to 65° C. or above and 95° C. or below, so that the optical recording medium can be obtained, which undergoes less decrease in reflectance the recording layer even in an environment of high temperature and high humidity or on the information reproduction with a high power laser light, thereby processing a much improved durability.

In the present invention, the amount of the acrylic acid, acrylate, methacrylic acid or methacrylate in the copolymer can be calculated based on a determination of the absorption of carbonyl in infrared absorption spectra.

In the present invention, the adhesive layer may have a melt flow rate as measured according to JIS K6730 (ASTM D1238), so adjusted as to be 2 to 10 g/10 min, and particularly from 2 to 5 g/10 min. In this case, excessive deformation of the adhesive layer can be prevented on the information recording resulting in uniform pit formation, and also deformation due to reproducing laser light on the information reproduction can be prevented giving an improved C/N of reproduced signals.

As for the additives used in the adhesive layer in the present invention, they are exemplified by a viscosity-providing agent and a softening agent. The viscosity-providing agent may include natural resins and modified products thereof as exemplified by rosin, polymerized rosin, hydrogenated rosin and rosin esters, aliphatic compounds, alicyclic compounds, aromatics, petroleum resins, terpene resins, terpene-phenol resins, hydrogenated terpene resins and cumarone resins. The softening agent may include process oils, paraffin oil, castor oil, polybutene and low-molecular polyisoprene. To the adhesive layer of the present invention, an ultraviolet absorbent or the like may be optionally added so long as no interaction with the recording layer is caused and no physical properties described above are changed.

Figure 2A:
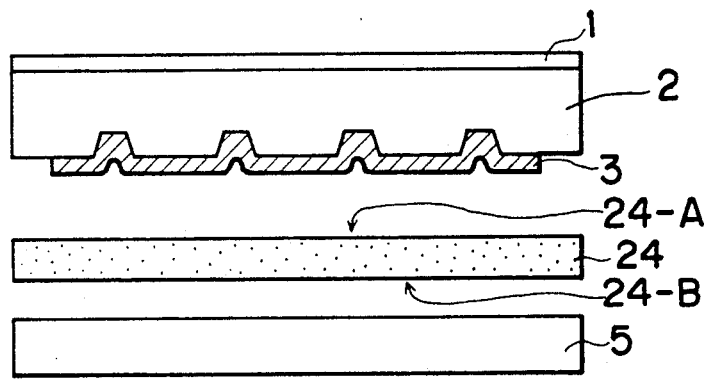
FIGS. 2A and 2B are schematic illustrations of an embodiment of the process for producing an optical recording medium according to the present invention.
Figure 2B:
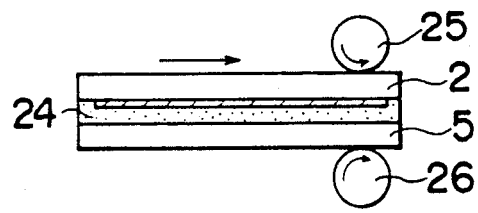

The process for producing the optical recording medium according to the present invention will be described below with reference to the accompanying drawings. FIGS. 2A and 2B illustrate a first embodiment of the process for producing the optical recording medium according to the present invention. Reference numeral 2 denotes an optical card substrate, on one of which side a preformat is formed and on which a recording layer 3 is formed. Reference numeral 24 denotes an adhesive film that becomes the adhesive layer 4 according to the present invention. To the recording layer 3 on the optical card substrate 2, the adhesive film 24 and a protective substrate 5 are successively laminated. Thereafter the laminate is passed through heat rollers 25 and 26 as shown in FIG. 2B to effect bonding. An optical card according to the present invention can be thus obtained. In this method, the surface temperature of the rollers 25 and 26 may vary depending on the materials for the adhesive film 24, and may preferably be 110° C. to 150° C. The rotational speed of the rollers may preferably be 0.1 to 0.5 m/min.

Figure 3:
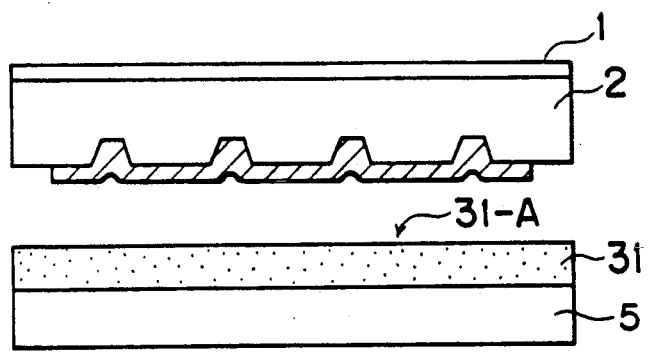
FIG. 3 is a schematic illustration of another embodiment of the process for producing an optical recording medium according to the present invention.
Figure 4:
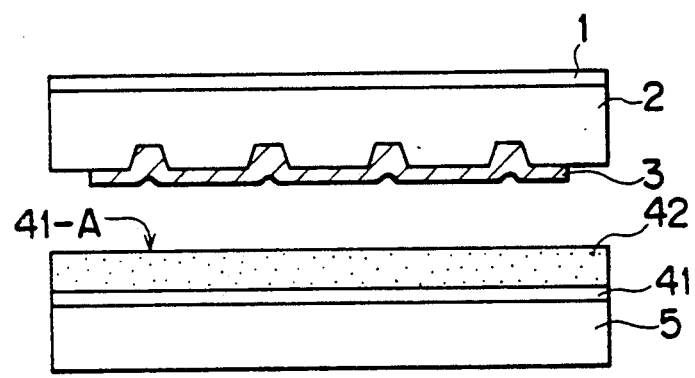
FIG. 4 is a schematic illustration of still another embodiment of the process for producing an optical recording medium according to the present invention.

As another method, as shown in FIG. 3, an adhesive layer 31 that becomes the adhesive layer 4 of the present invention is previously formed on the surface of a protective substrate 5, or as shown in FIG. 4, an adhesive layer 42 that becomes the adhesive layer 4 of the present invention is formed on the surface of a protective substrate 5 interposing another adhesive layer 41, and the protective substrate 5 is laminated to the optical card substrate In the above process for producing the optical recording medium according to the present invention, the surface of the adhesive layer, for example, the surfaces 24-A and 24-B of the adhesive film 24 shown in FIG. 2A, the surface 31-A of the adhesive layer 31 shown in FIG. 3 or the surface 41-A of the adhesive layer 42 shown in FIG. 4, may be modified before lamination so that the surface may have a critical surface tension of not less than 40 dyn/cm, and particularly from 45 to 54 dyn/cm. This enables improvement of adhesion between the adhesive film 24 and transparent substrate 2, the recording layer 3 and protective substrate 5, or the adhesive layer 31 and protective substrate 5, and also between the adhesive layer 41 and protective substrate 5.

Figure 5:
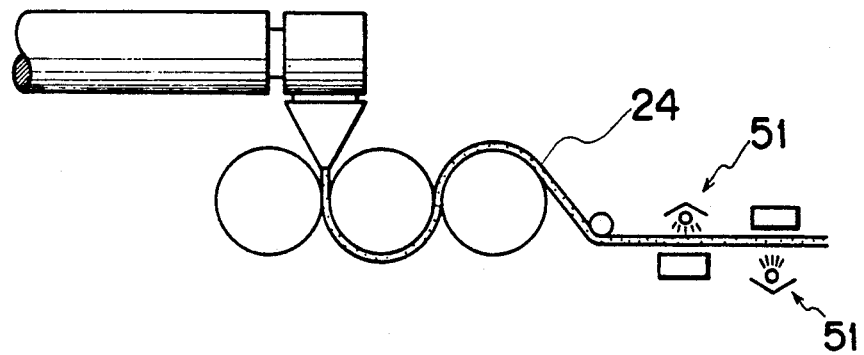
FIG. 5 is a schematic illustration of a method of surface-modifying an adhesive film used in the production process shown in FIGS. 2A and 2B.

Stated specifically, in the present invention, in the case where the adhesive layer 4 is so composed that the acrylic acid, acrylate, methacrylic acid or methacrylate in the copolymer is in a content of 20% by weight or less as previously described, the adhesive layer 4 comes to have a critical surface tension of, for example, from 30 to 37 dyn/cm. This results in a poor wettability of adhesives to resin substrates such as a polymethyl methacrylate (PMMA) substrate and a polycarbonate (PC) substrate usually used as optical recording medium substrates and/or protective substrates, and the adhesion between the adhesive layer 4 and transparent substrate 2 and/or protective substrate 5 tends to become slightly lower. The surface modification of the surface of the adhesive film or adhesive layer as described above brings about an improvement in the critical surface tension, which prohibits the lowering of the adhesive force. Here, there are no particular limitations on the method for the surface modification. The method may include, for example, corona discharge treatment, ozone treatment, alkali treatment, argon plasma treatment and oxygen plasma treatment. To describe specifically, when as the adhesive film shown in FIG. 2A, an adhesive film material comprised of the ethylene-acrylic acid copolymer is formed into a sheet by melt extrusion as shown in FIG. 5, corona discharge treatment may be applied immediately after extrusion into a film, to both sides by means of a corona discharging apparatus 51. Thus the critical surface tension of the adhesive sheet surface can be improved. Since the surface modification can be readily effected on both sides, the above production method is preferable for producing an optical recording medium having an excellent adhesion.

In the present invention, the critical surface tension is measured by the method prescribed in JIS K-6768.

The adhesive force required for the adhesive layer of the optical recording medium according to the present invention may preferably be 100 g/25 mm or more, particularly 400 g/25 mm or more, and more particularly 500 g/25 mm or more, as an adhesive force measured by the T-type peel test when two resin sheets with a thickness of 0.4 mm each are bonded through the adhesive layer.

In the present invention, there are no particular limitations on the thickness of the adhesive layer 4. It may usually be from 5 to 200 μm, and preferably from 10 to 120 μm.

Then, in the present invention, the optical recording layer 3 may preferably have a maximum absorption within a wavelength range of the recording light, e.g., a wavelength range of 650 nm or more, and particularly from 700 to 900 nm, which is the wavelength range of the semiconductor laser beam. It is also preferable that the energy required for producing optically detectable changes upon irradiation with the light beam is small. It is also preferable that a large difference in optical characteristics exists between information recording areas and non-recording areas, with respect to the light used for reproducing the information.

For such purposes, materials used in the optical recording layer 3 may include organic coloring matters as exemplified by anthraquinone derivatives (in particular, those having an indanthrene skeleton), dioxazine compounds and derivatives thereof, triphenodithiazine compounds, phenanthrene derivatives, cyanine compounds, merocyanine compounds, pyrylium compounds, xanthene compounds, triphenylmethane compounds, chroconium dyes, azo dyes, chroconics, azines, indigoids, polymethine dyes, azulene dyes, squarium dyes, cyanine dyes having a polymethine chain, and tetraphenylcyanine dyes.

In particular, use of a polymethine dye represented by the following Formula (1) or a cyanine dye represented by the following Formula (2) can bring about an optical recording medium having a particularly good durability.

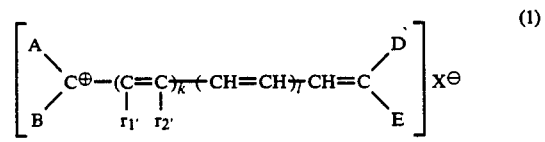

wherein, A, B, D and E each represent a hydrogen atom or a group selected from an alkyl group, an alkenyl group, an aralkyl group, an aryl group, a styryl group and a heterocyclic group; $r_1'$ and $r_2'$ each represent a hydrogen atom or a group selected from an alkyl group, a cyclic alkyl group, an alkenyl group, an aralkyl group and an aryl group; k represents 0 or 1; l represents 0, 1 or 2; and $X^\ominus$ represents an anion.

The aralkyl group, aryl group, styryl group or heterocyclic group in the definition for A, B, D, E, $r_1'$ and $r_2'$ may be substituted.

Letter symbols in the above formula will be described below in greater detail.

A, B, D and E each represent a hydrogen atom or an alkyl group as exemplified by a methyl group, an ethyl group, a n-propyl group, an iso-propyl group, a n-butyl group, a sec-butyl group, an iso-butyl group, a t-butyl group, an n-amyl group, a t-amyl group, a n-hexyl group, a n-octyl group or a t-octyl group, and may include other alkyl groups, for example, a substituted alkyl group as exemplified by a 2-hydroxyethyl group, a 2-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 2-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group or a 4-(acetylsulfamyl) butyl group, and a cyclic alkyl group as exemplified by a cyclohexyl group; an alkenyl group as exemplified by a vinyl group, a propenyl group, a butenyl group, a pentenyl group, a hexenyl group, a heptenyl group, an octenyl group, a dodecenyl group or a pulenyl group; and aralkyl group as exemplified by a benzyl group, a phenethyl group, an α-naphthylmethyl group or a β-naphthylmethyl group; a substituted aralkyl group as exemplified by a carboxybenzyl group, a sulfobenzyl group or a hydroxybenzyl group.

Letter symbols $r_1'$ and $r_2'$ each represent a hydrogen atom or an alkyl group as exemplified by a methyl group, an ethyl group, a n-propyl group, an iso-propyl group, a n-butyl group, a sec-butyl group, an iso-butyl group, a t-butyl group, an n-amyl group, a t-amyl group, a n-hexyl group, a n-octyl group or a t-octyl group, and may include other alkyl groups, for example, a substituted alkyl group as exemplified by a 2-hydroxyethyl group, a 2-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 2-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group or a 4-(acetylsulfamyl) butyl group, and a cyclic alkyl group as exemplified by a cyclohexyl group; an alkenyl group as exemplified by a vinyl group, a propenyl group, a butenyl group, a pentenyl group, a hexenyl group, a heptenyl group, an octenyl group, a dodecenyl group or a pulenyl group; and aralkyl group as exemplified by a benzyl group, a phenethyl group, an α-naphthylmethyl group or a β-naphthylmethyl group; a substituted aralkyl group as exemplified by a carboxybenzyl group, a sulfobenzyl group or a hydroxybenzyl group.

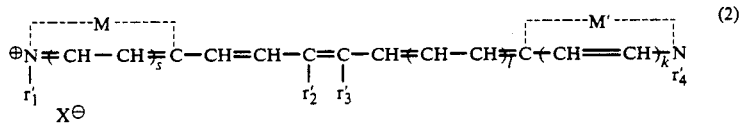

wherein M and M' each represent a group of atoms necessary to complete a nitrogen-containing heterocyclic ring such as pyridine, thiazole, benzothiazole, naphthothiazole, oxazole, benzoxazole, naphthoxazole, imidazole, benzimidazole, naphthoimidazole, 2-quinoline, 4-quinoline, isoquinoline or indole, and may be substituted with a halogen atom such as a fluorine atom, a chlorine atom, a bromine atom or an iodine atom, an alkyl group such as methyl, ethyl, propyl or butyl, an aryl group such as phenyl, tolyl or xylyl, or an aralkyl group such as benzyl or p-tolylmethyl.

Letter symbols $r_1'$ to $r_4'$ each represent a hydrogen atom, a substituted or unsubstituted alkyl group such as methyl, ethyl, propyl, isopropyl, butyl, t-butyl, amyl, isoamyl, hexyl, octyl, nonyl, dodecyl, methoxyethyl, hydroxyethyl or carboxypropyl, a substituted or unsubstituted aryl group such as phenyl, α-naphthyl, β-naphthyl, tolyl, xylyl, biphenyl, ethylphenyl, methoxyphenyl, ethoxyphenyl, dimethoxyphenyl, hydroxyphenyl, chloroxyphenyl, dichlophenyl, bromophenyl, dibromophenyl, nitrophenyl, diethylaminophenyl, dimethylaminophenyl or dibenzylaminophenyl, a substituted or unsubstituted aralkyl group such as benzyl, phenethyl, 3-phenylpropyl, methoxybenzyl, methylbenzyl or chlorobenzyl.

Letter symbols k and s are each 0 or 1, and l is 0, 1 or 2.

In the above Formulas (1) and (2), $X^\ominus$ is an anion, representing a chloride ion, a bromide ion, an iodide ion, a perchlorate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostannate ion, a chlorosulfonate ion, a fluorosulfonate ion, a trifluoromethanesulfonate ion, a hexanefluoroantimonate ion, a molybdate ion, a tungstate, a titanate ion or a zirconate ion.

In the adhesive layer of the present invention, an optical recording medium having a particularly good durability can be obtained when the adhesive layer of the present invention is formed in combination with a recording layer containing the above cyanine dye, in particular, a cyanine dye having the structure shown below.

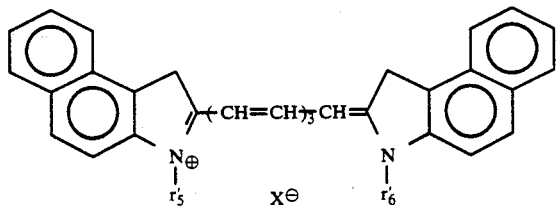

($r_5'$ and $r_6'$ are each an alkyl group.)

The optical recording layer containing any of these organic coloring matters may contain a stabilizer such as an infrared-absorbing compound for the purpose of improving light resistance.

Materials used as the stabilizer may include materials as disclosed in, for example, Japanese Laid-Open Patent Application Nos. 60-163245 and 60-236131, and materials represented by the following Formulas (V) and (VI).

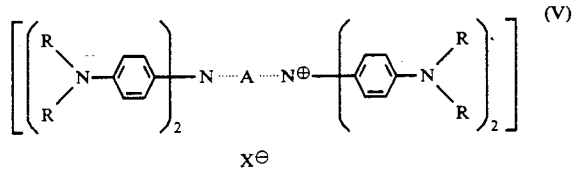

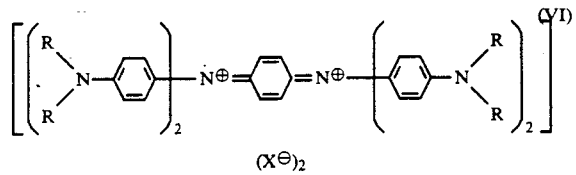

wherein R represents a hydrogen atom or a lower alkyl group, X represents an acid ion, and A represents

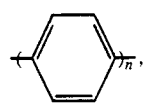

wherein n is 1 or 2.

In the above Formulas (V) and (VI), the substituent R may be an alkoxyalkyl group as exemplified by a methoxyethyl group, an alkenyl group as exemplified by a propenyl group, an alkynyl group as exemplified by a propagyl group, or a cyclic alkyl group as exemplified by a cyclopentyl group. Such a compound has a good function to stabilize the organic coloring matter, and can be a particularly preferable material when the recording layer 3 is formed by wet coating.

It is also possible to use metal complexes represented by the following Formulas (VII) to (XI), as a quencher having an effect to stabilize the organic coloring matter.

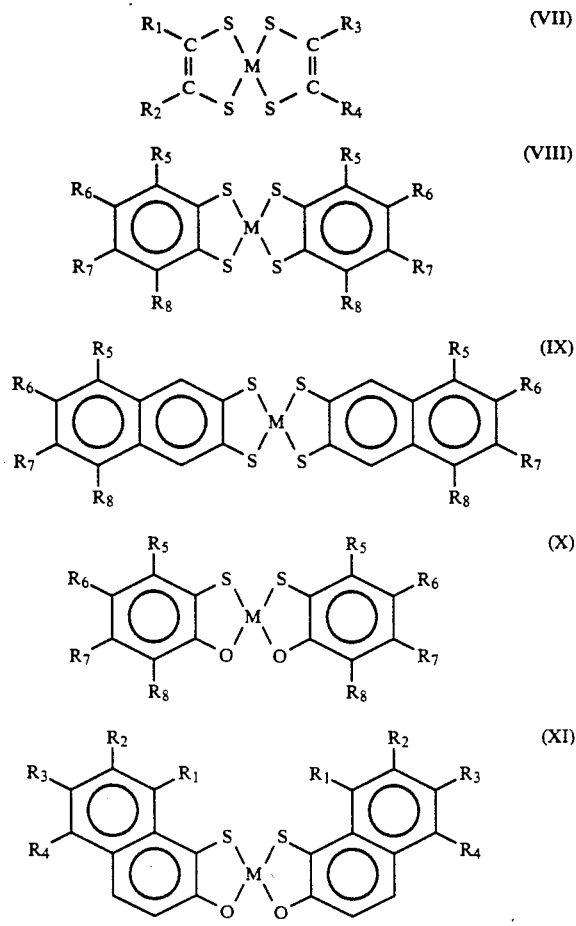

wherein $R_1$ to $R_4$ may be the same or different and each represent a substituted or unsubstituted alkyl group, an aryl group or an amino group; $R_5$ to $R_8$ may be the same or different and each represent a hydrogen atom, a halogen atom or a substituted or unsubstituted alkyl group or amino group; M represents a transition metal selected from Ni, Co, Mn, Cu, Pd and Pt.

The stabilizer or quencher contained in the optical recording layer 3 should be in an amount ranging usually from 5 to 50% by weight, and preferably from 10 to 30% by weight, based on the content of the coloring matter.

In the recording layer of the present invention, the organic coloring matter, stabilizer and quencher described above may be contained in a binder in a dispersed state or dissolved state. The binder used in the present invention may include cellulose esters such as nitrocellulose, cellulose phosphate, cellulose sulfate, cellulose acetate, cellulose propionate, cellulose butyrate, cellulose myristate, cellulose palmitate, cellulose acetate propionate and cellulose acetate-butyrate, cellulose ethers such as methyl cellulose, ethyl cellulose, propyl cellulose and butyl cellulose; polystyrene, and polyvinyl chloride.

When a layer containing the organic coloring matter is formed as the optical recording layer by wet coating, organic solvents usable in the coating may vary depending on whether the optical recording medium is brought into a dispersed state or a dissolved state. In general, it is possible to use alcohols such as methanol, ethanol, isopropanol and diacetone alcohol; ketones such as acetone, methyl ethyl ketone and cyclohexanone; amides such as N,N-dimethylformamide and N,N-dimethylacetamamide; sulfoxides such as dimethylsulfoxide; ethers such as tetrahydrofuran, dioxane and ethylene glycol monomethyl ether; and aliphatic halogenated hydrocarbons such as dichloromethane, dichloroethylene and trichloroethylene.

A coating solution prepared using any of these materials may be applied to the transparent substrate by any known coating methods as exemplified by dip coating, spray coating, spin coating, bar coating, blade coating, roll coating and curtain coating. The recording layer can be thus formed.

The recording layer may preferably have a layer thickness ranging from 400 to 1,200 Å. Usually it is preferable to set a layer thickness so as to obtain a maximum surface reflectance in its correlation with the film reflectance of the recording layer for obtaining signals with a superior C/N. When a reflective layer is provided on the side not irradiated by the light beam, it is preferable to set a layer thickness so as to minimize the surface reflectance of the recording layer for improving recording sensitivity.

As the substrate 2 used in the present invention, a transparent plastic plate made of PVC, polymethyl methacrylate, polycarbonate, polysulfone or polyolefin can be used. In particular, polymethyl methacrylate is preferred, which optically causes no double refraction and is hard enough not to be scratched with ease. The substrate is preferably made of an optically transparent material.

The protective substrate may preferably be made of a plastic material that may cause no warpage of the whole recording medium, and PMMA, PC, PVC and so forth can be used.

Figure 6:
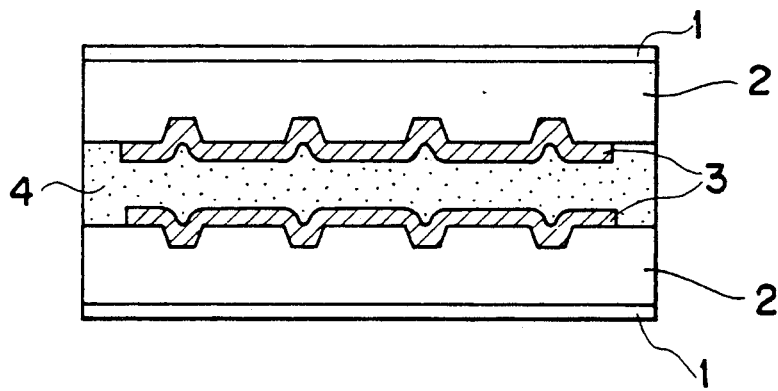
FIG. 6 is a schematic cross section of another embodiment of the optical recording medium according to the present invention.

In the present invention, as shown in FIG. 6, the optical recording medium may be a double-sided optical recording medium comprising a pair of substrates with recording layers formed on their surfaces, bonded in such a way that the recording layers face each other with an interposed adhesive layer.

As described above, according to the present invention, the optical recording layer and the adhesive layer are not prone to mutual diffusion when the optical recording medium is stored at high temperatures, so that an optical recording medium free from changes in reflectance of its optical recording layer and having superior durability can be obtained. According to the present invention, it is also possible to obtain an optical recording medium having a superior adhesion between the substrate and protective substrate, causing no changes in reflectance of its optical recording layer at high temperature and having more improved durability.

The present invention will be specifically described below by the following Examples.

EXAMPLE 1

Of a polymethyl methacrylate optical card substrate with a thickness of 0.4 mm, a length of 54 mm and a breadth of 85 mm broad, stripe-like pregrooves with a width of 3 pm and a pitch of 12 μm were formed on one side and on the other side, an ultraviolet-curable resin (trade name: Unidic 17-824-9 available from Dainippon Ink & Chemicals, Incorporated) was applied in a thickness of 3 μm, followed by irradiation with ultraviolet rays to form a hard coat. On the surface of the substrate on which the pregrooves had been formed, an optical recording layer comprised of a polymethine dye represented by structural formula (1-1) shown below and a stabilizer represented by structural formula (1-2) shown below, mixed in a proportion of 3:1 in weight ratio, was formed by solvent coating in a layer thickness of 900 Å.

Next, to thus formed organic coloring matter recording layer, a polymethyl methacrylate protective substrate with a thickness of 0.3 mm was superposed through an adhesive sheet of 54 mm long, 85 mm broad and 50 μm thick comprised of 100% by weight of an ethylene-methyl methacrylate copolymer (a sheet available from Sumitomo Chemical Co., Ltd.; trade name: WD201; MMA (methyl methacrylate) content: 10% by weight; melt flow rate: 2 g/10 min; Vicat softening temperature: 75° C.; surface tension: 32 dyn/cm), followed by lamination by pressure bonding using a heat roller having a surface temperature of 130° C. An optical card was thus produced.

Percentage of loss of reflectance after the optical recording medium has been stored for 100 hours in an environment of 70° C. and 90%
$RH = \{1 - (\text{measured value}/\text{initial value})\} \times 100$.

Results obtained in Example 1 are shown in Table 2.

Next, an optical card produced in the same manner as in Example 1 described above but not subjected to the running test was set on an optical card recording-reproducing apparatus (manufactured by Canon Inc.) to measure the time of deterioration by reproducing light.

The time of deterioration by reproducing light refers to the time taken for the reflectance of the recording layer to lower by 10% of the initial value when the optical card is fixed and continuously irradiated at a fixed point on the recording layer with a reproducing light beam (wavelength: 830 nm) at a fixed point.

In the present Example, the time of deterioration by reproducing light was measured under a reproducing light set to 0.1 mW or 0.2 mill. In each measurement, needless to say, a different point was used for the irradiation with reproducing light.

Results obtained are shown in Table 2.

EXAMPLE 2

The same kind of adhesive film as used in Example 1 was subjected to corona discharging on its both sides under the following conditions, to change the critical surface tension from 32 dyn/cm to 50 dyn/cm. Using the treated adhesive film, an optical card was produced

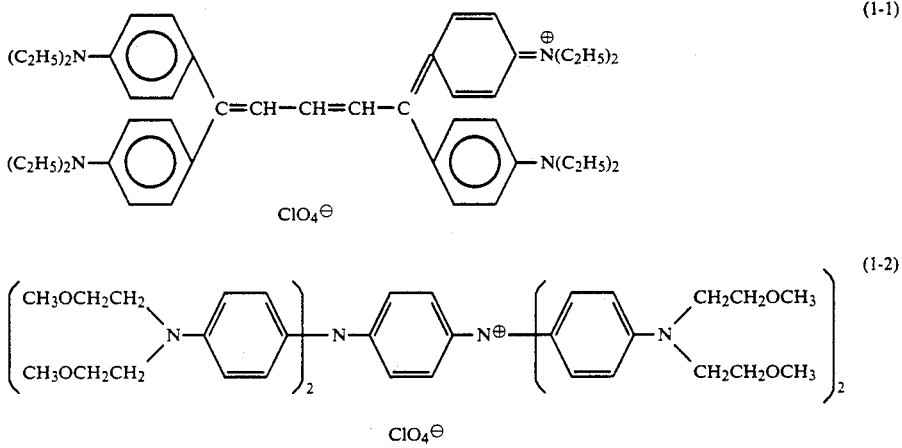

For the recording layer of the optical card thus obtained, its reflectance to a light beam having a wavelength of 830 nm and a spot diameter of 3 μm on the recording layer surface, was measured at the initial stage and after a running test using an optical card recording-reproducing apparatus (manufactured by Canon Inc.), to calculate the rate of loss of reflectance.

In regard to bond strength (or adhesive force), two polymethyl methacrylate sheets with thicknesses of 0.4 mm and 0.3 mm were laminated through the above adhesive sheet, which were then laminated by pressure bonded using a heat roller having a surface temperature of 130° C., to give a sample. This sample was cut in a width of 25 mm, and the bond strength was tested according to the T-type peel test method prescribed in JIS K6854.

In the present Example, the rate of loss of reflectance after the running test is defined as follows:

in the same manner as in Example 1, except that the roller surface temperature at the time of pressure bonding was set to 130° C. On the optical card thus obtained, the rate of reflectance loss after the running test was measured in the same manner as in Example 1.

The conditions of the corona discharging for adhesive sheet were as follows:

Using an experimental apparatus manufactured by Tantec Corp.
Power source output: 100 W
Electrode: φ2 wire type, 125 mm in width
Work distance/distance between electrodes: 2 to 3 mm
Speed at which the adhesive sheet passes beneath electrodes: 2 to 3 re/min The bond strength and the time of deterioration by reproducing light were also measured in the same manner as in Example 1.

Results obtained are shown in Table 2.

EXAMPLE 3

The same ethylene-methyl methacrylate copolymer as used in Example 1 and an ethylene-methyl methacrylate copolymer (trade name: WH302; available from Sumitomo Chemical Co., Ltd.; MMA content: 7% by weight; melt flow rate: 7 g/10 min) were mixed by 50% by weight each, and the mixture was formed into an adhesive sheet with a thickness of 50 μm. This adhesive sheet had a Vicat softening temperature of 68° C., a melt flow rate of 5 g/10 min and a surface tension of 33 dyn/cm.

This adhesive layer was subjected to corona discharging in the same manner as in Example 2 to change the surface tension to 54 dyn/cm, and an optical card was produced in the same manner as in Example 1. Evaluation was made similarly. The bond strength of the surface-treated adhesive sheet and the time of deterioration by reproducing light were also measured in the same manner as in Example 1.

Results obtained are shown in Table 2.

EXAMPLE 4

An optical card was produced in the same manner as in Example 2 except that the adhesive sheet used therein comprised of an ethylene-methacrylic acid copolymer (trade name: N-0903HC; available from Mitsui Du Pont Chemical Co., Ltd.; methacrylic acid content: 9% by weight; Vicat softening point: 80° C.; melt flow rate: 2 g/10 min), with an interfatial surface tension of 33 dyn/cm, and subjected to corona discharging to change the surface tension to 54 dyn/cm. Evaluation was made similarly. The bond strength of the adhesive sheet having been thus surface-modified and the time of deterioration by reproducing light were also evaluated in the same manner as in Example 1.

Results obtained are shown in Table 2.

COMPARATIVE EXAMPLE 1

An optical card was produced in the same manner as in Example 2 except that the adhesive sheet used therein was replaced with an adhesive sheet comprised of an maleic anhydride-methyl methacrylate-ethylene copolymer (trade name: LX4110; available from Sumitomo C.D.F. Chemical Co., Ltd.; Vicat softening point: 81° C.; melt flow rate: 5 g/10 min), with the surface tension of 40 dyn/cm. Evaluation was made similarly. The bond strength of the adhesive sheet was also evaluated in the same manner as in Example 1.

Results obtained are shown in Table 2.

COMPARATIVE EXAMPLE 2

An optical card was produced in the same manner as in Example 2 except that the adhesive sheet used therein comprised of an ethylene-acrylic acid copolymer (trade name: A500W; available from Mitsubishi Petrochemical Company Limited.; Vicat softening point: 50° C.; melt flow rate: 300 g/10 min; acrylic acid content: 20% by weight). Evaluation was made similarly. The bond strength of the adhesive sheet was also evaluated in the same manner as in Example 1.

Results obtained are shown in Table 2.

EXAMPLES 5 TO 10 & COMPARATIVE EXAMPLES 3, 4

Example 1 was repeated except that the adhesive sheet used therein had the composition and physical properties as shown in Table 1. On the optical cards thus produced, the bond strength, the rate of changes in reflectance and the time of deterioration by reproducing light were measured in the same manner as in Example 1.

Results obtained are shown in Table 2.

TABLE 1

| | (1) | (2) (wt %) | (3) (°C.) | (4) (wt %) | (5) (g/10 min) | (6) (dyn/cm) |
|---|---|---|---|---|---|---|
| Example: | | | | | | |
| 5 | EMMA | 100 | 65 | MMA 25 | 5 | 50 |
| 6 | EMMA | 80 | 65 | MMA 12 | 4 | 48 |
| 7 | EMMA | 75 | 65 | MMA 12 | 5 | 45 |
| 8 | EAA | 100 | 72 | AA 12 | 5 | 45 |
| 9 | EMA | 100 | 75 | MA 9 | 3 | 45 |
| 10 | EMA | 100 | 75 | MA 10 | 27 | 45 |
| Comparative Example: | | | | | | |
| 3 | EMMA | 100 | 60 | MMA 20 | 3 | 45 |
| 4 | EVA | — | 70 | VA 14 | — | 45 |

(1): Type of copolymer
(2): Total content of copolymer in adhesive layer
(3): Vicat softening point
(4): Content of acrylic acid, acrylate, methacrylic acid or methacrylate in copolymer, based on copolymer
(5): Melt flow rate
(6): Critical surface tension
EAA: Ethylene-acrylic acid copolymer
EMA: Ethylene-methyl acrylate copolymer
EVA: Ethylene-vinyl acetate copolymer
EMMA: Ethylene-methyl methacrylate copolymer
AA: Acrylic acid
MA: Methyl acrylate
VA: Vinyl acetate
MMA: Methyl methacrylate

TABLE 2

| | Bond strength (g) | Rate of change in reflectance (%) | Time of deterioration by reproducing light (sec.) | |
|---|---|---|---|---|
| | | | 0.1 mW | 0.2 mW |
| Example: | | | | |
| 1 | 100 | 3 | 2,000 | 350 |
| 2 | 500 | 3 | 2,000 | 350 |
| 3 | 600 | 4 | 1,500 | 280 |
| 4 | 600 | 3 | 2,000 | 350 |
| 5 | 500 | 9 | 1,200 | 200 |
| 6 | 600 | 5 | 1,500 | 250 |
| 7 | 650 | 10 | 1,400 | 210 |
| 8 | 400 | 3 | 1,600 | 300 |
| 9 | 400 | 3 | 1,800 | 330 |
| 10 | 500 | 5 | 1,800 | 300 |
| Comparative Example: | | | | |
| 1 | 500 | 20 | 1,000 | 200 |
| 2 | 500 | 10 | 500 | 30 |
| 3 | 500 | 3 | 1,200 | 150 |
| 4 | 300 | 40 | 1,300 | 200 |

Next, into the optical cards of Examples 1 and 10, information was written using an optical card recording-reproducing apparatus (manufactured by Canon Inc.) under conditions of a card transport speed of 480 mm/sec, a recording laser beam wavelength of 830 nm, a power of 15 mW and a duty of 1:1. The information was then reproduced under conditions of a card transport speed of 480 mm/sec, a reproducing laser beam wavelength of 830 nm and a power of 0.2 mW, and the C/N of signals at that time was measured. C/N of the optical card of Example 2 was 50 dB and that of the optical card of Example 10 was 40 dB.

EXAMPLE 11

An optical card was produced in the same manner as in Example 2 except that the recording layer was formed using a solution prepared by dissolving in diacetone alcohol 3.5% by weight of a combined material of a benzoindolenine type cyanine dye with a quencher, represented by the structural formulas shown below.

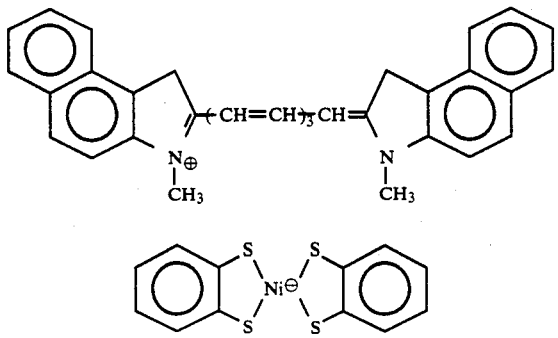

COMPARATIVE EXAMPLE 5

An optical card was produced in the same manner as in Example 11 except that the adhesive layer used therein was replaced with that of Comparative Example 3.

Evaluation was made on the optical cards of Example 11 and Comparative Example 5 in the same manner as in Example 1.

Results obtained are shown in Table 3.

TABLE 3

| | Bond strength (g) | Rate of change in reflectance (%) | Time of deterioration by reproducing light (sec.) | |
|---|---|---|---|---|
| | | | 0.1 mW | 0.2 mW |
| Example 11 | 500 | 10 | 800 | 100 |
| Comparative Example: 5 | 500 | 10 | 300 | 50 |

What is claimed is:

1. An optical recording medium comprising a substrate, a recording layer and a protective substrate laminated to said recording layer interposing an adhesive layer, wherein said adhesive layer contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

2. The optical recording medium according to claim 1, wherein said adhesive layer has a Vicat softening point of from 70° C. to 90° C.

3. The optical recording medium according to claim 1, wherein the acrylic acid, acrylate, methacrylic acid or methacrylate in said copolymer contained in said adhesive layer is in a content of not more than 20% by weight on the basis of each corresponding copolymer.

4. The optical recording medium according to claim 3, wherein said acrylic acid, acrylate, methacrylic acid or methacrylate is in a content of from 8% by weight to 15% by weight.

5. The optical recording medium according to claim 4, wherein said acrylic acid, acrylate, methacrylic acid or methacrylate is in a content of from 9% by weight to 12% by weight.

6. The optical recording medium according to claim 1, wherein said adhesive layer has a melt flow rate of from 2 g/10 min to 10 g/10 min.

7. The optical recording medium according to claim 6, wherein said adhesive layer has a melt flow rate of from 2 g/10 min to 5 g/10 min.

8. The optical recording medium according to claim 1, wherein said copolymer in said adhesive layer is in an amount of from 80% by weight to 100% by weight in total on the basis of said adhesive layer.

9. The optical recording medium according to claim 8, wherein said copolymer in said adhesive layer is in an amount of from 90% by weight to 100% by weight in total.

10. The optical recording medium according to claim 9, wherein said copolymer in said adhesive layer is in an amount of from 95% by weight to 100% by weight in total.

11. The optical recording medium according to claim 1, wherein said recording layer contains an organic coloring matter.

12. The optical recording medium according to claim 11, wherein said recording layer contains a polymethine dye.

13. The optical recording medium according to claim 12, wherein said recording layer contains a polymethine dye represented by the following Formula (1)

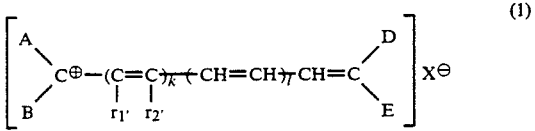

wherein, A, B, D and E each represent a hydrogen atom or a group selected from an alkyl group, an alkenyl group, an aralkyl group, an aryl group, a styryl group and a heterocyclic group; $r_1'$ and $r_2'$ each represent a hydrogen atom or a group selected from an alkyl group, a cyclic alkyl group, an alkenyl group, an aralkyl group and an aryl group; k represents 0 or 1; l represents 0, 1 or 2; and $X^{\ominus}$ represents an anion; and the aralkyl group, aryl group, styryl group or heterocyclic group in the definition for A, B, D, E, $r_1'$ and $r_2'$ may be substituted.

14. The optical recording medium according to claim 11, wherein recording layer contains a cyanine dye.

15. The optical recording medium according to claim 14, wherein said recording layer contains a cyanine dye represented by the following Formula (2)

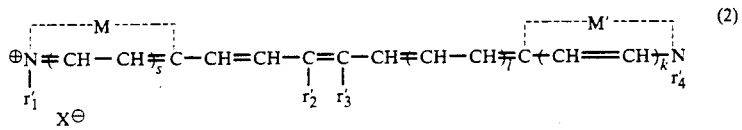

wherein M and M' each represent a group of atoms necessary to complete a substituted or unsubstituted nitrogen-containing heterocyclic ring; $r_1'$, $R_2'$, $R_3'$ and $R_4'$ each represent a hydrogen atom, a substituted or unsubstituted alkyl group, a substituted or unsubstituted aryl group, a substituted or unsubstituted aralkyl group; k and s are each 0 or 1; and l is 0, 1 or 2.

16. The optical recording medium according to claim 15, wherein said cyanine dye is an indolenine type cyanine dye represented by the following Formula (3)

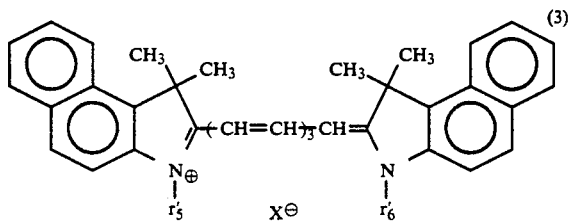

wherein $r_5'$ and $r_6'$ each represent an alkyl group.

17. The optical recording medium according to claim 1, wherein said optical recording medium is a card type optical recording medium.

18. The optical recording medium according to claim 1, wherein said optical recording medium is a disk type optical recording medium.

19. The optical recording medium according to claim 1, wherein at least one of said substrate and said protective substrate is a resin substrate.

20. The optical recording medium according to claim 1, wherein said adhesive layer has an adhesive force of not less than 100 g/25 mm.

21. The optical recording medium according to claim 20, wherein said adhesive layer has an adhesive force of not less than 400 g/25 mm.

22. A process for producing an optical recording medium, comprising the steps of;
laminating a protective substrate to a recording layer formed on a substrate, interposing an adhesive sheet; and
applying thermal press bonding to integrate said substrate and said protective substrate;
wherein said adhesive sheet contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

23. The process for producing an optical recording medium according to claim 22, wherein said adhesive sheet has a Vicat softening point of from 70° C. to 90° C.

24. The process for producing an optical recording medium according to claim 22, wherein the acrylic acid, acrylate, methacrylic acid or methacrylate in said copolymer used in said adhesive sheet is in a content of not more than 20% by weight on the basis of each corresponding copolymer.

25. The process for producing an optical recording medium according to claim 24, wherein the acrylic acid, acrylate, methacrylic acid or methacrylate in said copolymer used in said adhesive sheet is in a content of from 8% by weight to 15% by weight on the basis of each corresponding copolymer.

26. The process for producing an optical recording medium according to claim 25, wherein the acrylic acid, acrylate, methacrylic acid or methacrylate in said copolymer used in said adhesive sheet is in a content of from 9% by weight to 12% by weight on the basis of each corresponding copolymer.

27. The process for producing an optical recording medium according to claim 22, wherein at least one surface of said adhesive sheet has a critical surface tension of not less than 40 dyn/cm.

28. The process for producing an optical recording medium according to claim 27, wherein at least one surface of said adhesive sheet has a critical surface tension of from 45 dyn/cm to 54 dyn/cm.

29. The process for producing an optical recording medium according to claim 22, wherein said adhesive sheet has a melt flow rate of from 2 g/10 min to 10 g/10 min.

30. The process for producing an optical recording medium according to claim 29, wherein said adhesive sheet has a melt flow rate of from 2 g/10 min to 5 g/10 min.

31. The process for producing an optical recording medium according to claim 22, wherein said copolymer in said adhesive sheet is in an amount of from 80% by weight to 100% by weight in total on the basis of said adhesive sheet.

32. The process for producing an optical recording medium according to claim 31, wherein said copolymer in said adhesive sheet is in an amount of from 90% by weight to 100% by weight in total on the basis of said adhesive sheet.

33. The process for producing an optical recording medium according to claim 32, wherein said copolymer in said adhesive sheet is in an amount of from 95% by weight to 100% by weight in total on the basis of said adhesive sheet.

34. The process for producing an optical recording medium according to claim 22, wherein said recording layer contains an organic coloring matter.

35. The process for producing an optical recording medium according to claim 22, wherein said thermal pressure bonding is carried out using a heat roller.

36. The process for producing an optical recording medium according to claim 35, wherein said heat roller has a surface temperature of from 110° C. to 150° C.

37. A process for producing an optical recording medium, comprising the steps of;
laminating a protective substrate provided with an adhesive layer to a recording layer formed on a substrate, in such a way that said recording layer comes into contact with said adhesive layer, and;
applying thermal press bonding to integrate said substrate and said protective substrate;
wherein said adhesive layer contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

38. The process for producing an optical recording medium according to claim 37, wherein the side facing to the recording layer of said adhesive layer is surface-modified to have a critical surface tension of not less than 40 dyn/cm.

39. An optical recording medium comprising two substrates each having a recording layer formed thereon, said substrates being bonded in such a way that said recording layers face to each other interposing an adhesive layer, wherein said adhesive layer contains at least one copolymer selected from the group consisting of an ethylene-acrylic acid copolymer, an ethylene-acrylate copolymer, an ethylene-methacrylic acid copolymer and an ethylene-methacrylate copolymer, and has a Vicat softening point of from 65° C. to 95° C.

40. An information recording method comprising;
irradiating an optical recording medium comprising a substrate, a recording layer and a protective substrate laminated to said recording layer interposing an adhesive layer, with a recording light beam to form pits in said recording layer to record information therein; said adhesive layer containing at least one copolymer selected from the group consisting of an ethylene-acrylic acid copolymer, an ethylene-acrylate copolymer, an ethylene-methacrylic acid copolymer and an ethylene-methacrylate copolymer, and having a Vicat softening point of from 65° C. to 95° C.

41. The optical recording medium according to claim 1, wherein said ethylene-acrylate copolymer is represented by the following formula:

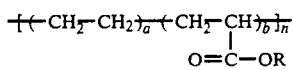

wherein a, b and n are each a positive integer, and R is $CH_3$, $C_2H_5$ or $C_3H_7$.

42. The optical recording medium according to claim 1, wherein said ethylene-methacrylate copolymer is represented by the following formula:

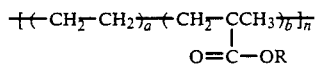

wherein a, b and n are each a positive integer, and R is $CH_3$, $C_2H_5$ or $C_3H_7$.

43. The process for producing an optical recording medium according to claim 22, wherein said ethylene-acrylate copolymer is represented by the following formula:

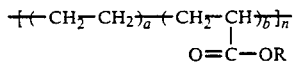

wherein a, b and n are each a positive integer, and R is $CH_3$, $C_2H_5$ or $C_3H_7$.

44. The process for producing an optical recording medium according to claim 22, wherein said ethylene-methacrylate copolymer is represented by the following formula:

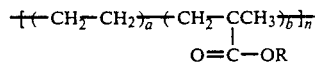

wherein a, b and n are each a positive integer, and R is $CH_3$, $C_2H_5$ or $C_3H_7$.

45. The process for producing an optical recording medium according to claim 37, wherein said ethylene-acrylate copolymer is represented by the following formula:

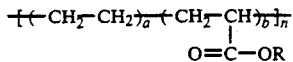

wherein a, b and n are each a positive integer, and R is $CH_3$, $C_2H_5$ or $C_3H_7$.

46. The process for producing an optical recording medium according to claim 37, wherein said ethylene-methacrylate copolymer is represented by the following formula:

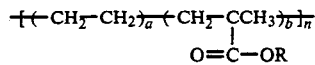

wherein a, b and n are each a positive integer, and R is $CH_3$, $C_2H_5$ or $C_3H_7$.

47. The optical recording medium according to claim 39, wherein said ethylene-acrylate copolymer is represented by the following formula:

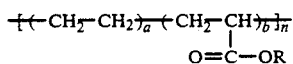

wherein a, b and n are each a positive integer, and R is $CH_3$, $C_2H_5$ or $C_3H_7$.

48. The optical recording medium according to claim 39, wherein said ethylene-methacrylate copolymer is represented by the following formula:

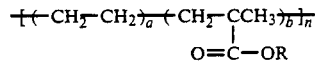

wherein a, b and n are each a positive integer, and R is $CH_3$, $C_2H_5$ or $C_3H_7$.

49. The information recording medium according to claim 40, wherein said ethylene-acrylate copolymer is represented by the following formula:

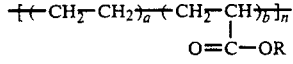

wherein a, b and n are each a positive integer, and R is $CH_3$, $C_2H_5$ or $C_3H_7$.

50. The information recording medium according to claim 40, wherein said ethylene-acrylate copolymer is represented by the following formula:

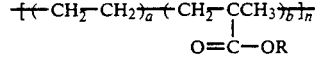

wherein a, b and n are each a positive integer, and R is $CH_3$, $C_2H_5$ or $C_3H_7$.

* * * * *

UNITED STATES PATENT AND TRADEMARK OFFICE
CERTIFICATE OF CORRECTION

PATENT NO. : 5,312,714

DATED : May 17, 1994

INVENTOR(S) : YOSHIHIRO OGAWA

It is certified that error appears in the above-indentified patent and that said Letters Patent is hereby corrected as shown below:

ON COVER PAGE:

At [56] Under Heading "FOREIGN PATENT DOCUMENTS":
Lines 7-13,   "6417235   1/1989   Japan
              1146144   6/1989   Japan
                23116   1/1990   Japan
              2116036   4/1990   Japan
              2273339  11/1990   Japan
              3119532   5/1991   Japan
              3156742   7/1991   Japan"
should read as follows:
           -- 64-17235   1/1989   Japan
              1-146144   6/1989   Japan
               2-3116    1/1990   Japan
              2-116036   4/1990   Japan
              2-273339  11/1990   Japan
              3-119532   5/1991   Japan
              3-156742   7/1991   Japan   --.

COLUMN 1:
    Line 53, "thinnes" should read --thinness--.

COLUMN 6:
    Line 1:  "reflectance" should read --reflectance of--; and
    Line 66, "substrate" should read --substrate 2.--.

COLUMN 11:
    Line 68, "acetate propionate" should read --acetate-propionate--.

UNITED STATES PATENT AND TRADEMARK OFFICE
CERTIFICATE OF CORRECTION

PATENT NO. : 5,312,714

DATED : May 17, 1994

INVENTOR(S) : YOSHIHIRO OGAWA

It is certified that error appears in the above-indentified patent and that said Letters Patent is hereby corrected as shown below:

<u>COLUMN 13</u>:
    Line 20, "superposeded" should read --superposed--.

<u>COLUMN 14</u>:
    Line 20, "0.2 mill." should read --0.2 mW.--; and
    Line 64, "3 re/min" should read --3 m/min--.

Signed and Sealed this

Twenty-ninth Day of November, 1994

Attest:

BRUCE LEHMAN

*Attesting Officer*      *Commissioner of Patents and Trademarks*